United States Patent
Yen et al.

(10) Patent No.: US 9,430,501 B1
(45) Date of Patent: Aug. 30, 2016

(54) TIME SANITIZATION OF NETWORK LOGS FROM A GEOGRAPHICALLY DISTRIBUTED COMPUTER SYSTEM

(71) Applicant: EMC Corporation, Hopkinton, MA (US)

(72) Inventors: Ting-Fang Yen, Cambridge, MA (US); Ari Juels, Brookline, MA (US); Kaan Onarlioglu, Brookline, MA (US); Alina Oprea, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 56 days.

(21) Appl. No.: 13/731,654

(22) Filed: Dec. 31, 2012

(51) Int. Cl.
*G06F 17/30* (2006.01)

(52) U.S. Cl.
CPC ... *G06F 17/30283* (2013.01); *G06F 17/30008* (2013.01); *G06F 17/30067* (2013.01)

(58) Field of Classification Search
None
See application file for complete search history.

(56) References Cited

U.S. PATENT DOCUMENTS

| | | | | |
|---|---|---|---|---|
| 7,594,146 B2 * | 9/2009 | Horikawa | ........... | G06F 11/3476 702/187 |
| 8,719,452 B1 * | 5/2014 | Ding et al. | ................... | 709/248 |
| 2007/0185689 A1 * | 8/2007 | Muraski et al. | ............... | 702/187 |
| 2010/0223239 A1 * | 9/2010 | Madsen et al. | ............... | 707/695 |
| 2013/0346377 A1 * | 12/2013 | Barnett | ......................... | 707/692 |

FOREIGN PATENT DOCUMENTS

| | | |
|---|---|---|
| CN | 102594625 A | 7/2012 |
| WO | 2013014672 A1 | 1/2013 |

* cited by examiner

*Primary Examiner* — Cheryl Lewis
*Assistant Examiner* — Raheem Hoffler
(74) *Attorney, Agent, or Firm* — BainwoodHuang

(57) ABSTRACT

Time correction records are created for correcting timestamps of network logs to identify timing of network events in a predetermined time reference frame, the network logs being created by logging devices generating the timestamps in device time reference frames. For each logging device, one or more network events are generated or identified at respective event times in the predetermined time reference frame, each network event having a corresponding event-related network log from the logging device and a respective timestamp in a device time reference frame. For each network event, a respective difference value is calculated as a difference between the event time and a respective timestamp from a network log. For each logging device, a selection function is applied to the difference values to calculate a correction value, and the correction value is stored along with an identifier of the logging device in a time correction record.

12 Claims, 4 Drawing Sheets

TIME SANITIZATION OF NETWORK LOGS FROM A GEOGRAPHICALLY DISTRIBUTED COMPUTER SYSTEM

BACKGROUND

The present application relates to the field of computer system monitoring, and more particularly to the use of timestamp information appearing in logs of computer system activity.

Computer systems and devices make extensive use of logs to collect information regarding computer system operation. Log information can be used for a variety of purposes including accounting, troubleshooting, and various types of monitoring including security-related monitoring. For example, security information and event management (SIEM) systems are known that receive logs generated by devices such as servers, network devices, etc., and use the information in the logs to assess system operation from a security perspective.

Logs include timestamps in order to identify the times at which logs are generated. A log timestamp can often serve as an approximation of the time that the underlying event being reported actually occurred, especially when the logging device is directly involved in the underlying event. As an example, a log from a DHCP server will accurately reflect the actual time that an IP address was assigned to a host, because the DHCP server itself performed the assignment action and messaging—there is essentially no delay between the action and the logging of the action.

There are known network protocols relating to identifying time in a network of computers. For example, the Network Time Protocol or NTP, http://www(dot)ntp(dot)org, allows machines to synchronize their local clocks with designated NTP servers. NTP makes no provision for conveying information about time zones or daylight savings time, and machines are required to actively contact NTP servers for synchronization.

SUMMARY

It can be important for applications that use information from network logs to identify the exact time when an event (e.g., web domain access, user login) was generated. Such logs may be generated by logging devices and provided to a Security Information and Event Management (SIEM) system, for example. Consistent timestamps are necessary in order to correlate logs recorded by different devices, and to accurately track incidents associated with a sequence of events. Ideally, event timestamps should be expressed in a universal time that is not affected by daylight savings or other external factors.

However, the challenge in a geographically distributed infrastructure is that there are many administrative domains, where different devices across different parts of the globe are configured differently. The event timestamp in a log message hence depends on the clock settings of the logging device. Unfortunately, documentation about individual device configurations is scarce or non-existent in large enterprises. Even though it may seem like identifying the devices' geographic location would solve this problem, there is no guarantee that a device's clock would be configured according to its geographic time zone. Thus, relying on device timestamps for absolute time information may lead to incorrect analysis of a sequence of logged events.

Techniques are described for translating timestamps of log messages, such as received by a SIEM system, from different devices in the enterprise into UTC time. In an active approach, specific probes are sent to a logging device to determine its clock configuration. A passive approach depends solely on the contents of the log messages, without requiring any additional configuration information about logging devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
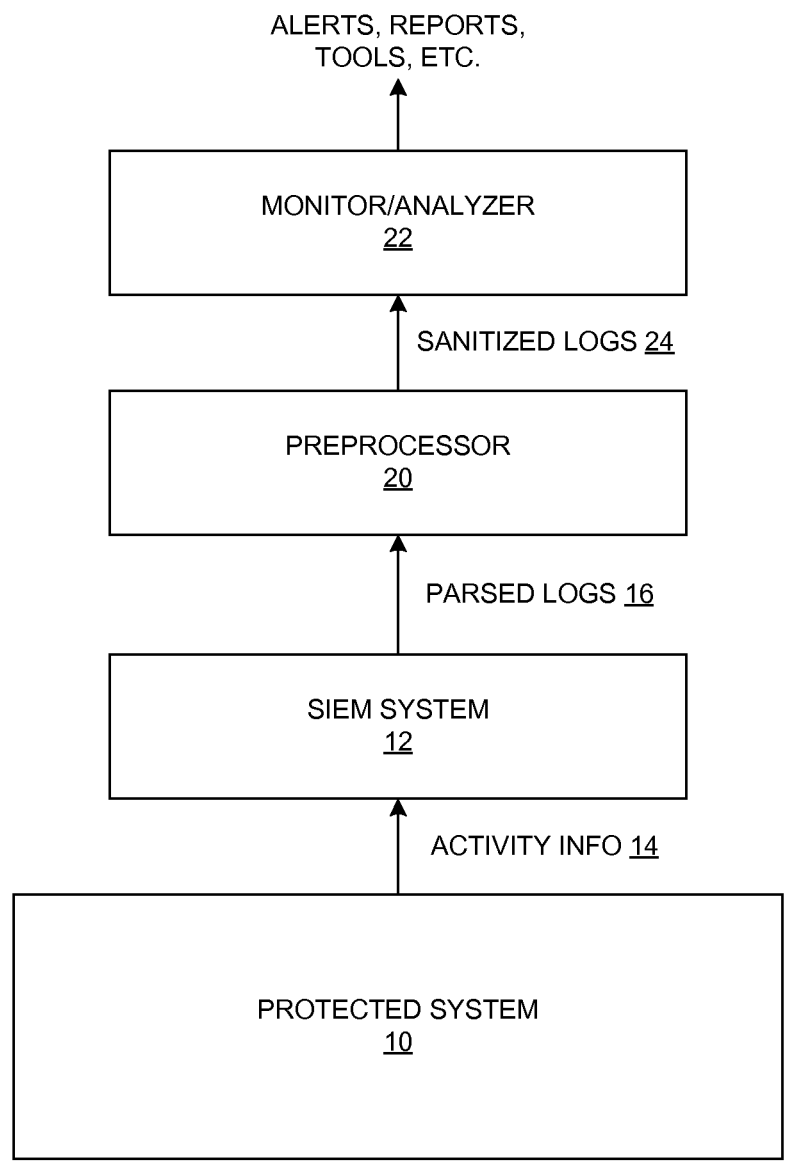
FIG. 1 is a block diagram of a networked computer system.

FIG. 1 shows a computing system augmented by monitoring and/or protection elements. In particular, the system includes a protected distributed computing system (PROTECTED SYSTEM) 10 and a security information and event management (SIEM) system 12 continually receiving a wide variety of system activity information 14 from operational components of the protected system 10. The SIEM system generates parsed logs 16 of logged activity information which are provided to monitoring/protection system including a preprocessor 20 and a monitor/analyzer 22. The preprocessor 20 generates sanitized logs 24 for use by the monitor analyzer 22, which in turn provides user-level functionality to a separate human or machine user, the functionality including things like alerts, reports, interactive tools for controlling or augmenting operations, etc.

The protected system 10 is generally a wide-area distributed computing system, such as a large organizational network. It may include one or more very large datacenters, as well as a number of smaller or "satellite" datacenters, all interconnected by a wide-area network that may include public network infrastructure (Internet) along with private networking components such as switches and routers, firewalls, virtual private network (VPN) components, etc. Each datacenter includes local resources such as server computers (servers), client computers and storage systems, coupled together using local/intermediate networks such as local-area networks (LANs), metro-area networks (MANs), storage-area networks (SANs), etc.

The SIEM system 12 is a specialized computing system including hardware computing components executing specialized SIEM software components, including a large database for storing the parsed logs 16. The SIEM system 12 receives raw logs (not shown) generated by logging devices in the system and performs basic parsing into fields (e.g. IP address, timestamp, msg ID, etc.) to produce the parsed logs 16. In one embodiment the SIEM system may utilize a SIEM product known as enVision™ sold by RSA Security, Inc., the security division of EMC Corporation. The SIEM system 12 gathers the raw logs generated by different devices within the protected system 10 and stores the parsed logs 16 in the database, functioning as a centralized repository. The logs 16 need to be stored for some period of time (e.g., at least several months) in order to enable the analysis described herein.

The monitor/analyzer 22 may be any of a variety of types of tools for system monitoring as well as other functions, including security-related functions. It may be primarily software-implemented, utilizing hardware resources of the SIEM system 12 or in some cases its own dedicated hardware computers. Both the monitor/analyzer 22 and the preprocessor are described herein as collections of functional components. As described below, these are to be understood as one or more general-purpose computers executing specialized software for realizing each function.

In one embodiment the monitor/analyzer 22 and preprocessor 20 are components of a threat detection system that may employ both top-down and bottom-up components. A top-down component builds and utilizes templates based on known information about current and prior advanced persistent threat or APT attacks, and these templates are used in analysis for detecting behavior that may be indicative of such attacks. The bottom-up component gathers, stores and processes the system activity information as reflected in the sanitized logs 24 from the preprocessor 20. The bottom-up component may include, inter alia, sensors and correlators. Examples of sensors include a command-and-control (C & C) sensor, new login sensor, new applications sensor and critical servers sensor. The correlators work from output of the sensors in the form of reports. Examples of correlators include C & C and new application correlator, unusual login correlator and C & C and new login correlator.

Figure 2:
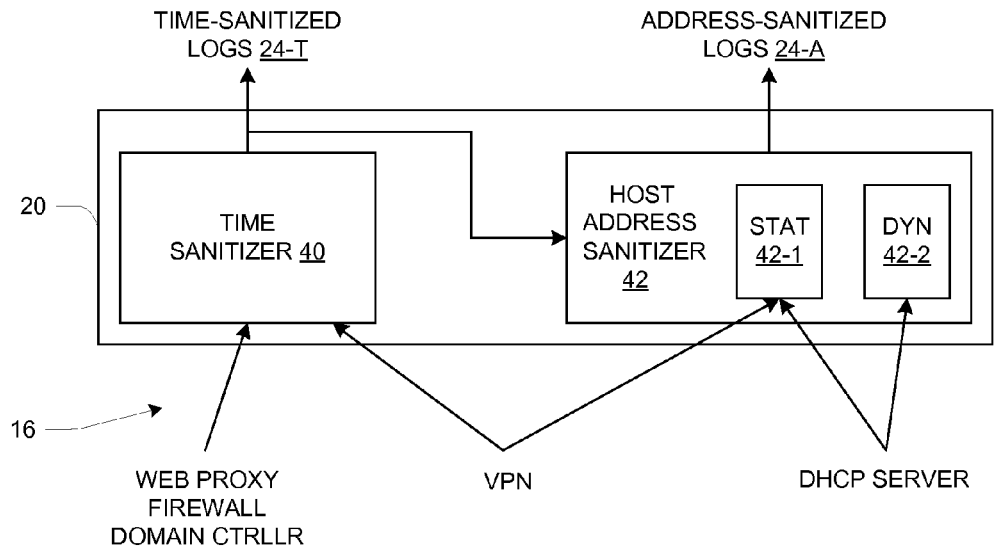
FIG. 2 is a block diagram of a preprocessor.

FIG. 2 shows the preprocessor 20. Because of inconsistencies in the parsed logs 16 (out-of-order events, time skew, missing events, etc.), the parsed log data needs to be processed and sanitized before any analysis is attempted. To this end, the preprocessor 20 includes a time sanitizer 40 and a host address sanitizer 42, these generating time-sanitized logs 24-T and address-sanitized logs 24-A respectively. The host address sanitizer 42 includes a first sanitizer (STAT) 42-1 for static host addresses and a second sanitizer (DYN) 42-2 for dynamic host addresses. Example parsed log inputs 16 are shown, including logs from web proxies, firewalls, domain controllers, VPN components, and Dynamic Host Control Protocol (DHCP) servers. Specific aspects of the preprocessor 20 are described below.

With respect to host addresses, it is generally necessary to address inconsistencies arising from dynamic IP address assignments, as well as to develop lists of static IP addresses active in the enterprise. To deal with dynamic IP addresses (IPs), it is necessary to develop a consistent mapping between network (IP) addresses and hostnames/MAC addresses. This is done by parsing DHCP and VPN logs. To study hosts that are assigned static IP addresses, IP addresses may be examined that do not appear in DHCP and VPN logs. For example, these IPs may be obtained from security gateway logs and host operating system (e.g., Windows) event logs. The hostname associated with those IP addresses may be looked up (e.g., by reverse DNS resolution using tools such as "nslookup" or "host") repeatedly over time. An IP address that always resolves to the same hostname is considered static.

For time sanitization, the parsed logs 16 are sanitized so that all log entries for all devices are reported in one consistent time, such as UTC time. The sanitization procedure is done by the time sanitizer 40. It is assumed that a list of all logging devices that report to the SIEM system 12 is known (e.g., a list of IP addresses of all logging devices). It is also assumed that the log timestamp translation is done after the parsed logs 16 are collected by the SIEM system 12, i.e., administrator privileges to the logging devices are not available, so that the devices' clock configurations cannot be modified. The output of the technique is the time zone configuration of each logging device. This information may be stored in the following format:

| Field Name | Description |
| --- | --- |
| Paddr | IP address of the logging device |
| δ | Time difference (UTC - device, to nearest 15 minute interval) |

Given the above information for each logging device, all log timestamps can be translated into UTC by adding the corresponding δ value to the device timestamp. For example, if a device timestamp in a parsed log 16 has the value T2, the adjusted log timestamp for that log message is T2+δ.

Background on Timestamps in SIEM Systems

Before being collected by a SIEM system 12, raw logs are generated by devices that process events from users or hosts in the enterprise network. For example, an event (e.g., a HTTP request) may be generated by a host at time T1. The request is processed by a device (e.g., the enterprise's web proxy), where a log describing that event is created at time T2. The log is then sent to a centralized collection point (i.e., the SIEM system 12), where it is received at time T3. The raw log is parsed as mentioned above to generate a corresponding parsed log 16.

In the log-collection infrastructure, each log message includes two timestamps: one applied by the device that created the log (e.g., T2), and the other applied by the SIEM system 12 indicating the time when it received this log (e.g., T3). T1 is generally not recorded, and it is generally assumed that the difference between T2−T1 is small enough that it can be ignored without causing inaccurate analysis.

One method for dealing with timestamp ambiguities in SIEM systems is to rely solely on the time at which the SIEM system received the logs (i.e., T3). Regardless of the time zone to which the logging device adheres, the centralized collection point at the SIEM system stamps all logs it receives consistently according to the same clock. For example, the enVision timestamp is in UTC time. The problem with this approach is that there can be arbitrary delays between when a log is generated and when it is delivered to the collection point. The difference Δ=T3−T2 can be quite large (even on the order of hours) and variable, due to network latency, batched log delivery, or other delays incurred by the SIEM system.

A more accurate representation of when an event took place is the device timestamp (i.e., T2), translated into UTC time. For this, it is necessary to know the specific time zone configuration of each logging device in the enterprise. The techniques described herein are directed to obtaining such information.

Figure 3:
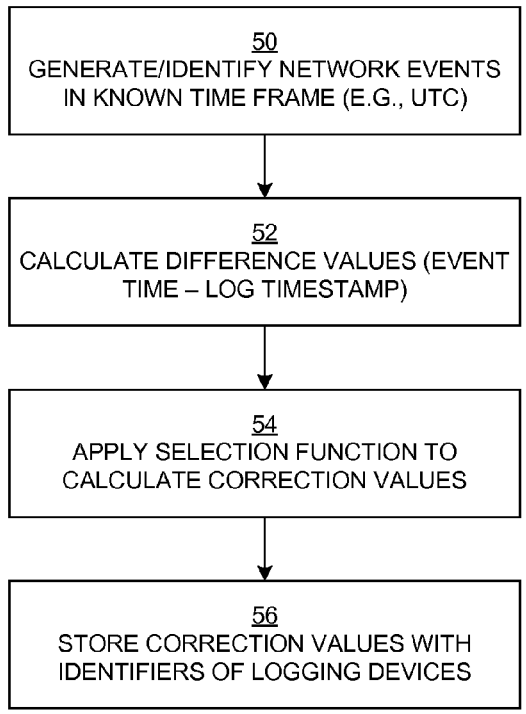
FIG. 3 is a flow diagram for a time sanitization process.

FIG. 3 describes the general procedure by which the timestamp correction values δ are determined. At 50, network events occurring in a known time frame (e.g., UTC) are either generated or simply identified (if existing by action of a separate mechanism). Examples of both operations are given below. The network events are known to have corresponding entries with timestamps in the parsed logs 16. At 52, difference values are calculated, each being a difference between an event time in the known time frame and a timestamp of the raw log entry. At 54, a selection function is applied to the difference values to obtain a correction value for each logging device. At 56, the correction values are stored in association with respective identifiers of the logging devices (e.g., the IP address values Paddr).

Two different approaches are described for the general process of FIG. 3.

1. Active Approach

One direct approach to detect a device's configured time zone is to send it "probes" over the network soliciting responses containing clock information. This is difficult in practice because neither the IP, UDP, or TCP headers include timestamps. Also, for security reasons many machines ignore packets sent to unused ports.

In an alternative active approach, rather than contacting a logging network device directly, events are generated that will be logged (and time-stamped) by the device. For example, a Windows domain controller validates user logon events and generates logs describing the outcome of the logon attempts as it does so. Thus, log entries and timestamps can be created by performing logons. As another example, a web proxy forwards clients' HTTP requests and generates logs describing the network connection at the same time. Log entries and timestamps can be created by issuing HTTP requests.

Let the known time at which a testing event E is generated be TE, which is represented in UTC time. After the logging device processes this event, a log message is created with the device's timestamp TD. In terms of elapsed time, the difference between TE and TD is very small, e.g., on the order of milliseconds, because the same device often performs event processing and log generation. This is true in both the above examples (Windows domain controller, web proxy).

The difference value $\delta$=TD−TE can be calculated, rounded off to the nearest 15 minutes (since that is the level of granularity at which time zones are set). Since TE is represented in UTC time, the device's time zone is hence known to be configured as UTC time−$\delta$.

2. Passive Approach

While the active approach can be quite accurate and efficient, it may not be suitable for use in a large network with many different logging devices. In this case, events may be directed to different processing/logging devices depending on the source host's geographic location or network configuration. Without a comprehensive understanding of the topology of the enterprise network and access to multiple distributed client machines, the active approach may become infeasible.

An alternative passive approach may leverage information available in logs collected by a SIEM system to determine the devices' clock configuration. In this case, the "event" used for calculating correction values is the receipt by the SIEM system 12 of a log message from a logging device. Such an event is not actively generated, but rather simply identified by examining the SIEM system timestamps. The clock configuration in the SIEM system 12 may be static, which simplifies the processing. For example, the SIEM system 12 may generate all its timestamps in UTC time.

At a high level, the passive approach compares the device timestamp TD with the SIEM system timestamp TS for all log messages generated by a device, where the SIEM system timestamp TS reflects the time that the SIEM system 12 received the log messages. Let $\delta$ be the difference between TD and TS, rounded off to the nearest 15 minutes. From a set of (possibly inconsistent) $\delta$ values derived from all logs generated by a device over a certain time period (e.g., one month), a process is employed to determine the correct actual time correction value for the device.

Figure 4:
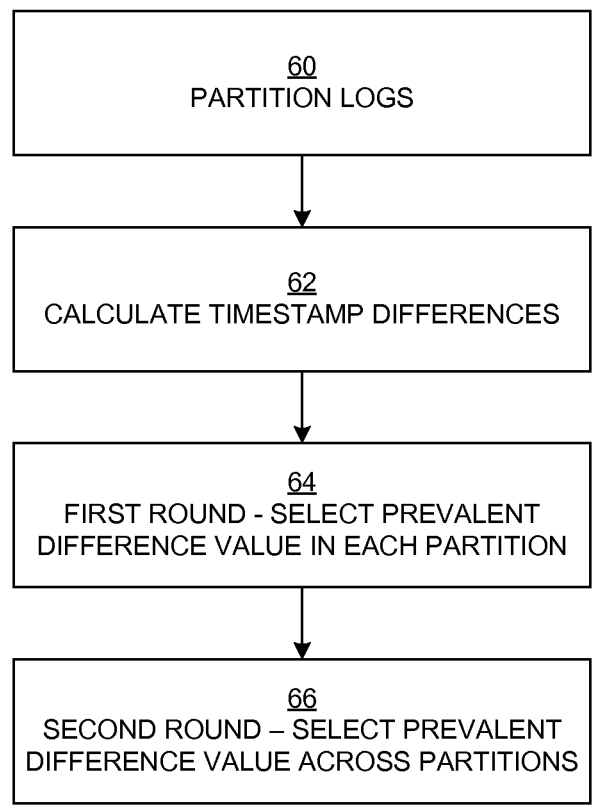
FIG. 4 is a flow diagram from a passive time sanitization process.

One example of such a process is shown in FIG. 4 and described below:

60—Separate logs that are generated in the same 24-hour period into corresponding sets referred to below as "partitions".

62—For each log generated by this device, calculate the difference $\delta$ between the SIEM timestamp TS and the device timestamp TD, rounded off to the nearest 15 minutes.

The following steps 64 and 66 represent first and second rounds of calculating error correction values:

64—For each partition, find the $\delta$ that is applicable to the largest fraction of logs.

66—Find the $\delta$ that is most prevalent across all partitions, for example the value applicable to the greatest number of partitions. This value is identified as the correction value for the device.

The above procedure outputs the difference $\delta$ between the SIEM timestamp and the device timestamp corresponding to the largest fraction of logs generated by a device in the first round and to the most number of partitions in the second round. Alternative criteria may be used, including the following:

Output the majority of the difference $\delta$ in each round if it exists, or otherwise consider logs generated by the device inconsistent.

Output the difference $\delta$ in each round corresponding to at least a percentage x>50% of all the logs generated by the device.

Alternatively, use a single-round error correction procedure applied to the set of all logs available for analysis (e.g., one month). In this case, the logs are not separated by partition, but instead the error correction algorithm is applied to the entire data set. Similar techniques (largest fraction, majority, minimum percentage) can be applied for determining the correction value in this case.

While the correction values calculated for logging devices will generally not change, it is nonetheless desirable to perform a periodic update to ensure ongoing accuracy. It is necessary to obtain correction values for any new logging devices added to the network. For existing devices, their time zone configurations may not be completely static over time, due to adjustments made for daylight savings time for example.

When the active approach described above is in use, this same process can be repeated for updating.

When the passive approach of FIG. 4 is in use, it is not necessary to re-learn all device configurations from historical data as described above. Since a configuration change would affect all logs from that device, the update process only needs to examine recently generated logs (e.g., from the current day).

Figure 5:
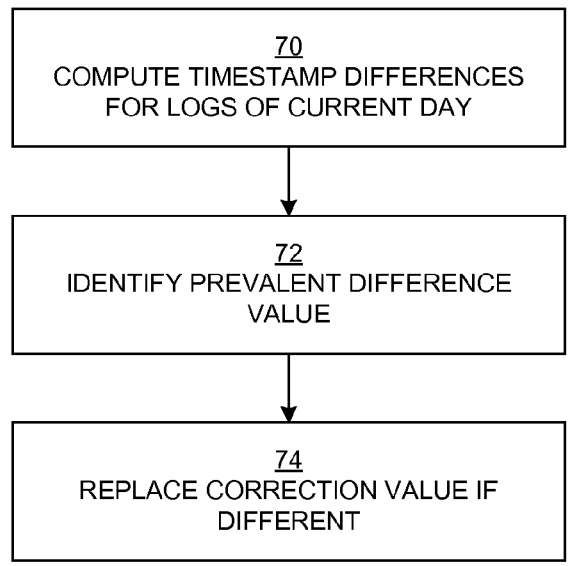
FIG. 5 is a flow diagram for a time sanitization updating process.

FIG. 5 outlines an update process usable with the passive process of FIG. 4. This process is performed for each logging device.

At 70, the difference between the SIEM timestamp TS and the device timestamp TD is calculated for all logs generated by a device in the current day, for example. The difference value is rounded to the nearest 15 minutes.

At 72, the value $\delta'$ corresponding to the largest fraction F % of logs generated by the device that day is identified. If F % is sufficiently large (e.g., over 80%), then the value δ' is taken as the correction value.

At 74, if δ' is different from the existing δ, then δ is replaced with δ'.

Information external to the system may be used to schedule updates, including daylight savings time start and end dates around the world. Alternatively, in more dynamic networks, updates can also be run more frequently, e.g., on a daily, weekly or monthly basis.

Figure 6:
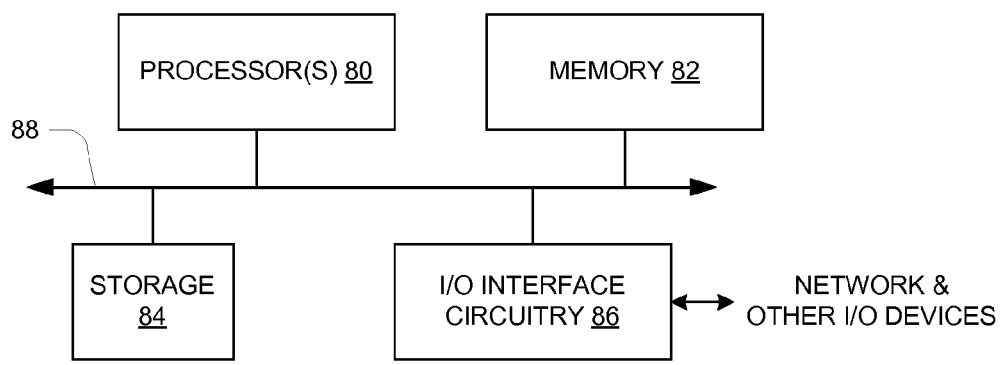
FIG. 6 is a block diagram of a computer from a hardware perspective.

FIG. 6 is a generalized depiction of a computer such as may be used to realize the computers in the system, including hosts of the protected system 10 whose activities are monitored as well as computers implementing the SIEM system 12 and threat detection system 18. It includes one or more processors 80, memory 82, local storage 84 and input/output (I/O) interface circuitry 86 coupled together by one or more data buses 88. The I/O interface circuitry 86 couples the computer to one or more external networks, additional storage devices or systems, and other input/output devices as generally known in the art. System-level functionality of the computer is provided by the hardware executing computer program instructions (software), typically stored in the memory 82 and retrieved and executed by the processor(s) 80. Any description herein of a software component performing a function is to be understood as a shorthand reference to operation of a computer or computerized device when executing the instructions of the software component. Also, the collection of components in FIG. 6 may be referred to as "processing circuitry", and when executing a given software component may be viewed as a function-specialized circuit, for example as an "analyzer circuit" when executing a software component implementing an analyzer function.

While various embodiments of the invention have been particularly shown and described, it will be understood by those skilled in the art that various changes in form and details may be made therein without departing from the scope of the invention as defined by the appended claims.

In addition to translating log timestamps into a consistent time zone, another application of the disclosed techniques is to detect device misconfigurations. For example, comparing the device's geographic location with its time zone information can reveal cases where the device's clock is set erroneously. Similarly, the techniques can detect when legitimate configuration updates should occur (e.g., daylight saving time adjustments) but that are not executed.

What is claimed is:

1. A method of operating a host computer as a preprocessor for creating a set of time correction records usable in applying corrections to timestamps of network logs to identify the timing of network events in a predetermined time reference frame, the network logs being created by and received from respective logging devices generating the timestamps in respective device time reference frames, comprising:

by the host computer for each logging device, generating one or more network events at respective event times in the predetermined time reference frame, each network event being observed by a respective logging device and known to have a corresponding event-related network log (i) generated by the respective logging device and (ii) having a respective timestamp in a device time reference frame of the logging device;

by the host computer for each of the network events, (i) receiving a respective network log from the respective logging device, and (ii) calculating a respective difference value as a difference between the respective event time and the timestamp of the respective network log of the respective logging device; and by the host computer for each logging device, applying a selection function to the difference values of the respective network events to calculate a correction value, and storing the correction value along with an identifier of the logging device in a corresponding time correction record, wherein generating one or more network events for the logging device includes generating network activity requiring processing by a network device whose network activity is logged in the network logs generated by the logging device, and wherein applying the selection function for each logging device includes selecting the respective calculated difference value as the correction value.

2. A method according to claim 1, wherein the logging device is a domain controller, and wherein generating the network activity includes, by the host computer, performing a logon to the domain controller.

3. A method according to claim 1, wherein the logging device is a network proxy operative to forward hypertext transfer protocol requests from a requestor to a target server in a network, and wherein generating the network activity includes, by the host computer, sending a hypertext transfer protocol request to the network proxy.

4. A method according to claim 1, further including receiving the network logs from the logging devices at respective log reception times, each network log being received after a generally arbitrary delay from the respective event time in the predetermined time reference frame.

5. A method according to claim 1, further including, by the host computer for each logging device, (i) deriving time zone information for the device based on the correction value and the time zone in which the host computer operates, and (ii) comparing a known geographic location of the logging device with the time zone information to determine whether a clock of the logging device is set erroneously.

6. A method according to claim 1, further including, by the host computer for each logging device, (i) identifying a time when a legitimate time-related configuration update should occur, and (ii) determining, based on the correction value, whether the legitimate time-related configuration update has actually occurred.

7. A non-transitory computer-readable storage medium having computer program instructions stored thereon, the computer program instructions being executable by a host computer as a preprocessor to perform a method of creating a set of time correction records usable in applying corrections to timestamps of network logs to identify the timing of network events in a predetermined time reference frame, the network logs being created by and received from respective logging devices generating the timestamps in respective device time reference frames, the method including:

by the host computer for each logging device, generating one or more network events at respective event times in the predetermined time reference frame, each network event being observed by a respective logging device and known to have a corresponding event-related network log (i) generated by the respective logging device and (ii) having a respective timestamp in a device time reference frame of the logging device;

by the host computer for each of the network events, (i) receiving a respective network log from the respective logging device, and (ii) calculating a respective difference value as a difference between the respective event time and the timestamp of the respective network log of the respective logging device; and by the host computer for each logging device, applying a selection function to the difference values of the respective network events to calculate a correction value, and storing the correction value along with an identifier of the logging device in a corresponding time correction record, wherein generating one or more network events for the logging device includes generating network activity requiring processing by a network device whose network activity is logged in the network logs generated by the logging device, and wherein applying the selection function for each logging device includes selecting the respective calculated difference value as the correction value.

8. A non-transitory computer-readable storage medium according to claim 7, wherein the logging device is a domain controller, and wherein generating the network activity includes, by the host computer, performing a logon to the domain controller.

9. A non-transitory computer-readable storage medium according to claim 7, wherein the logging device is a network proxy operative to forward hypertext transfer protocol requests from a requestor to a target server in a network, and wherein generating the network activity includes, by the host computer, sending a hypertext transfer protocol request to the network proxy.

10. A non-transitory computer-readable storage medium according to claim 7, wherein the method performed by the host computer further includes receiving the network logs from the logging devices at respective log reception times, each network log being received after a generally arbitrary delay from the respective event time in the predetermined time reference frame.

11. A non-transitory computer-readable storage medium according to claim 7, wherein the method performed by the host computer by execution of the instructions further includes, for each logging device, (i) deriving time zone information for the device based on the correction value and the time zone in which the host computer operates, and (ii) comparing a known geographic location of the logging device with the time zone information to determine whether a clock of the logging device is set erroneously.

12. A non-transitory computer-readable storage medium according to claim 7, wherein the method performed by the host computer by execution of the instructions further includes, for each logging device, (i) identifying a time when a legitimate time-related configuration update should occur, and (ii) determining, based on the correction value, whether the legitimate time-related configuration update has actually occurred.

\* \* \* \* \*